United States Patent [19]

Goeken et al.

[11] 4,419,766
[45] Dec. 6, 1983

[54] METHODS AND MEANS FOR PROVIDING IMPROVED AIR/GROUND RADIO TELEPHONE COMMUNICATIONS

[76] Inventors: John D. Goeken, Rt. 3, Plainfield, Ill. 60544; Edward J. Henley, 13707 Sloan St., Rockville, Md. 20853

[21] Appl. No.: 200,557

[22] Filed: Oct. 24, 1980

[51] Int. Cl.³ .................... H04B 17/00; H04B 7/26
[52] U.S. Cl. ........................... 455/62; 455/67; 455/56; 455/226; 179/2 EB
[58] Field of Search ............ 455/62, 65, 67, 75, 455/76, 84–86, 89, 133, 134, 135, 136, 202, 203, 226, 46, 47, 53, 54, 56, 52; 179/2 EB

[56] References Cited

U.S. PATENT DOCUMENTS

| | | | |
|---|---|---|---|
| 2,976,411 | 3/1961 | Kahn . | |
| 3,134,103 | 5/1964 | Flower | 455/65 |
| 3,206,679 | 9/1965 | Miller | 455/135 |
| 3,434,056 | 3/1969 | Becker | 455/67 |
| 3,487,312 | 12/1969 | Egan | 455/62 |
| 3,543,161 | 11/1970 | Hatton | 455/67 |
| 3,628,149 | 12/1971 | Swan | 455/133 |
| 3,860,872 | 1/1975 | Richardson | 455/56 |
| 3,973,203 | 8/1976 | Kahn | 455/202 |
| 4,140,973 | 2/1979 | Stevens | 455/62 |

OTHER PUBLICATIONS

Air/Ground Radiotelephone System, Airfone Inc., transmitted to FCC on Oct. 25, 1979.
System Planner, Motorola, R4-1-68, Published Dec. 1976, pp. 1–66.
Technical Characteristics of an SSB Public Radiotelephone System Operating within the Frequency Bands 454.675–455.000 MC/S and 459,675–460.000 MC/S, Document No. DO-130, Radio Technical Commission for Aeronautics, printed 11/23/65.
Public Air/Ground Radiotelephone System, Document No. DO-125, Radio Technical Commission for Aeronautics, 7/31/64.

Primary Examiner—Tommy P. Chin

[57] ABSTRACT

An improved system and method for providing air/ground communications compatible with ground based telephone systems.

The airborne equipment incorporates means for comparing signals received from various ground stations located along the flight path so as to allow the selection of the "best" signal to provide good telephone communications service for a reasonable length telephone conversation.

18 Claims, 9 Drawing Figures

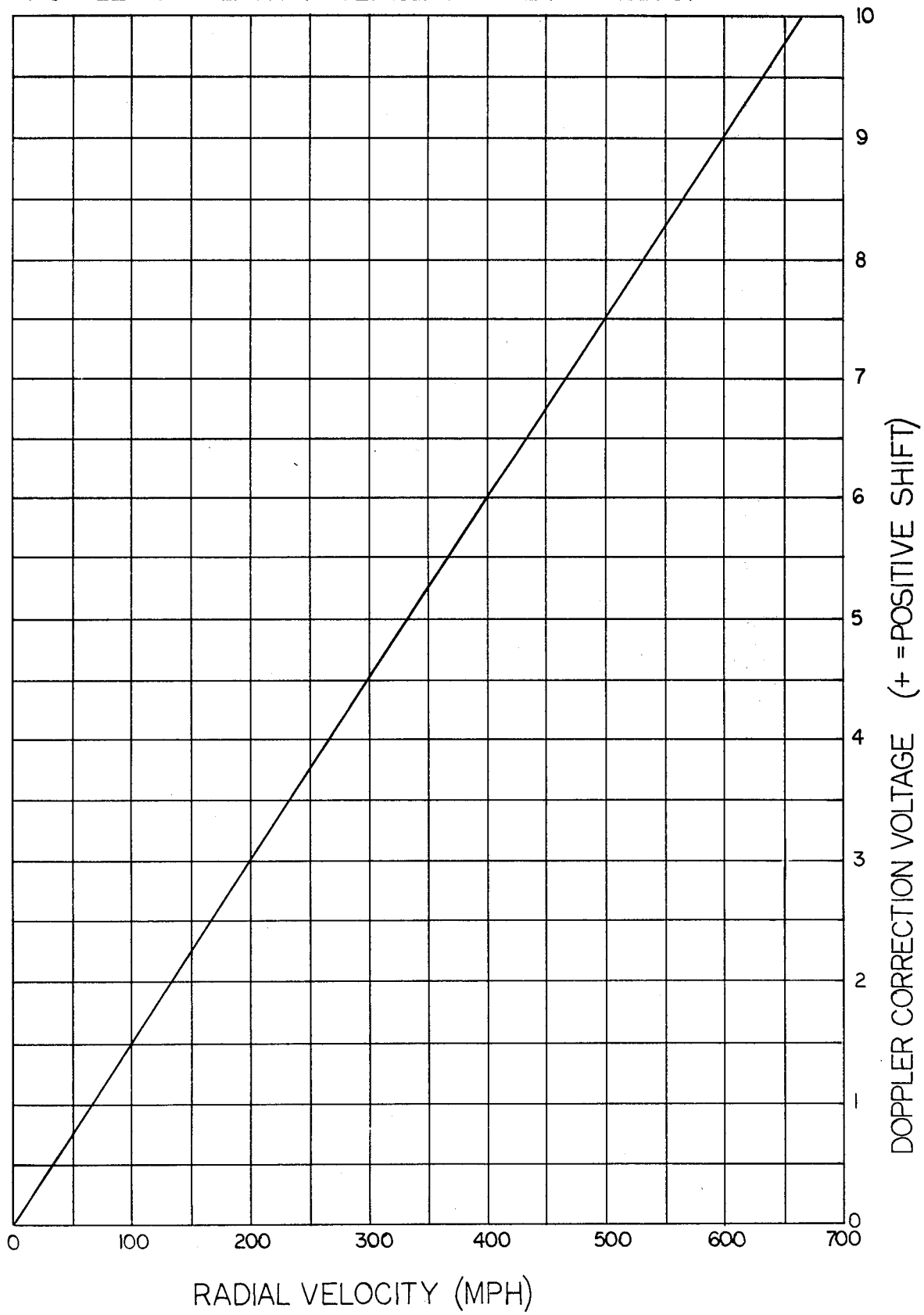

METHODS AND MEANS FOR PROVIDING IMPROVED AIR/GROUND RADIO TELEPHONE COMMUNICATIONS

BACKGROUND OF THE INVENTION

While the invention is subject to a wide range of applications it is especially suited for use in air/ground radio telephone communications and will be particularly described in this connection.

In providing telephone service in aircraft, which may be used by passengers without any special radio operating experience, it is essential that the signal-to-noise ratio be at least commensurate with typical terrestrial telephone circuits the entire period of a normal length telephone conversation. For example, if the telephone conversation extends for a six minute interval on a high speed aircraft, say traveling at MACH 1 and subject to strong tail winds at 200 miles per hour, the aircraft can travel almost 100 terrestrial miles during the course of the conversation. If such systems use UHF channels and moderate transmitter power levels, the aircraft can fly out of the range of a specific ground station if the ground station is incorrectly selected. Therefore, it is essential, if reliable telephone communication is to be provided, that the selected ground station be "best" not only when the phone conversation is initiated but during an entire reasonable length conversation.

In the following, the term "best" signal refers to a signal that is expected to provide good performance, not only when a telephone call is initiated, but also for a period of time into the future. Thus, actually the selected "best" signal may not be the strongest signal or the signal enjoying the highest signal-to-noise ratio at the instant the selection is made.

A number of different performance criteria falls under this "best" designation, but common to all, is that part of the evaluation of which signal is "best", is whether a candidate's signal strength is expected to increase during the course of the telephone call.

Sophisticated voting methods for selecting one signal from a group of candidate signals according to signal strength or signal-to-noise ratio, are known, but such system selections are based upon the existing circuit conditions and do not consider future conditions. The instant invention treats both present and short term future circuit conditions.

It is also possible to implement selection of a ground station during the course of a flight by knowledge of the flight plan and the location of the various ground stations along the flight path. However, such a procedure requires pre-programming of circuitry and an adherence to a specific flight plan. Furthermore, weather, traffic conditions, etc. may require a change of flight plan and, accordingly, such a pre-programmed procedure will fail. It is noteworthy that a change in flight plan during the course of a trip would be a major reason for high activity of the air/ground telephone facilities. Thus, under a condition where there would, almost certainly, be a large amount of telephone traffic the system would be prone to fail.

Another possible technique would be to feed navigational information to the radio telephone communications equipment, allowing the navigational information to be used to locate the "best" ground station. Such a procedure would complicate the equipment and would increase costs. Furthermore, since the navigational equipment is of extreme importance to air safety, any failures caused by the interfacing of the telephone communications equipment would be most unacceptable.

SUMMARY OF THE INVENTION

Characteristics, features, and advantages of the present invention are realized by utilizing, in addition to measurements of the relative strength of the various candidate ground stations' signals, their doppler frequency errors to select a ground station signal that meets acceptance standards at the initiation of the telephone conversation and that provides an acceptable signal during the entire course of the telephone conversation.

A further advantage is that the system does not require information as to the actual location of the aircraft; thus, there is no need to interface between navigational systems aboard the aircraft or any prior knowledge of the actual flight plan.

It is a basic object of this invention, in one major application, to provide reliable telephone communications for passengers of commercial airlines allowing their access to the terrestrial telephone network.

The present invention, as applied to an air/ground radio telephone system, utilizes a multiplicity of ground stations located along the approximate expected path of the aircraft so that communications can be established during substantial periods of time. The operating frequencies of the ground stations are not repeated in less than a predetermined distance so as to minimize interference. The airborne radio equipment incorporates reception means equipped to switch to the various assigned frequencies of the ground stations. In a preferred embodiment of the invention, the receiving equipment incorporates means for scanning the various frequencies transmitted by the ground stations prior to the establishment of a telephone circuit.

During the scanning of the signals, means are provided in the receiver for sensing the signal strength of the received signals and other means are provided for sensing the Doppler frequency error of said received signals. Information from the two sensing means is stored so that it allows other means to compare the signal strength measurements and the Doppler frequency measurements if the various carrier frequencies scanned. By this procedure, a signal can be selected which may be expected to provide best service during a predetermined maximum length telephone conversation. Means is also provided to control the airborne transmission frequencies so as to be compatible with the selected ground station's receiver.

Another embodiment of the invention combines the Doppler frequency measurements with the signal strength measurements so as to favor the "best" signal that meets at least a minimum signal strength specification and which will provide acceptable signal strength for the longest period of time.

For a better understanding of the present invention, together with other and further objects thereof, reference is had to the following description, taken in connection with the accompanying drawings, while its scope will be pointed out in the appended claims.

BRIEF DESCRIPTION OF THE DRAWINGS

FIG. 9 is a curve of the Doppler correction voltage vs radial velocity where radial velocity is the velocity towards or away from which the aircraft flies. The correction voltage is positive when the aircraft flies towards the ground station and negative when it flies away from the station.

DESCRIPTION OF THE PREFERRED EMBODIMENTS

Figure 1:
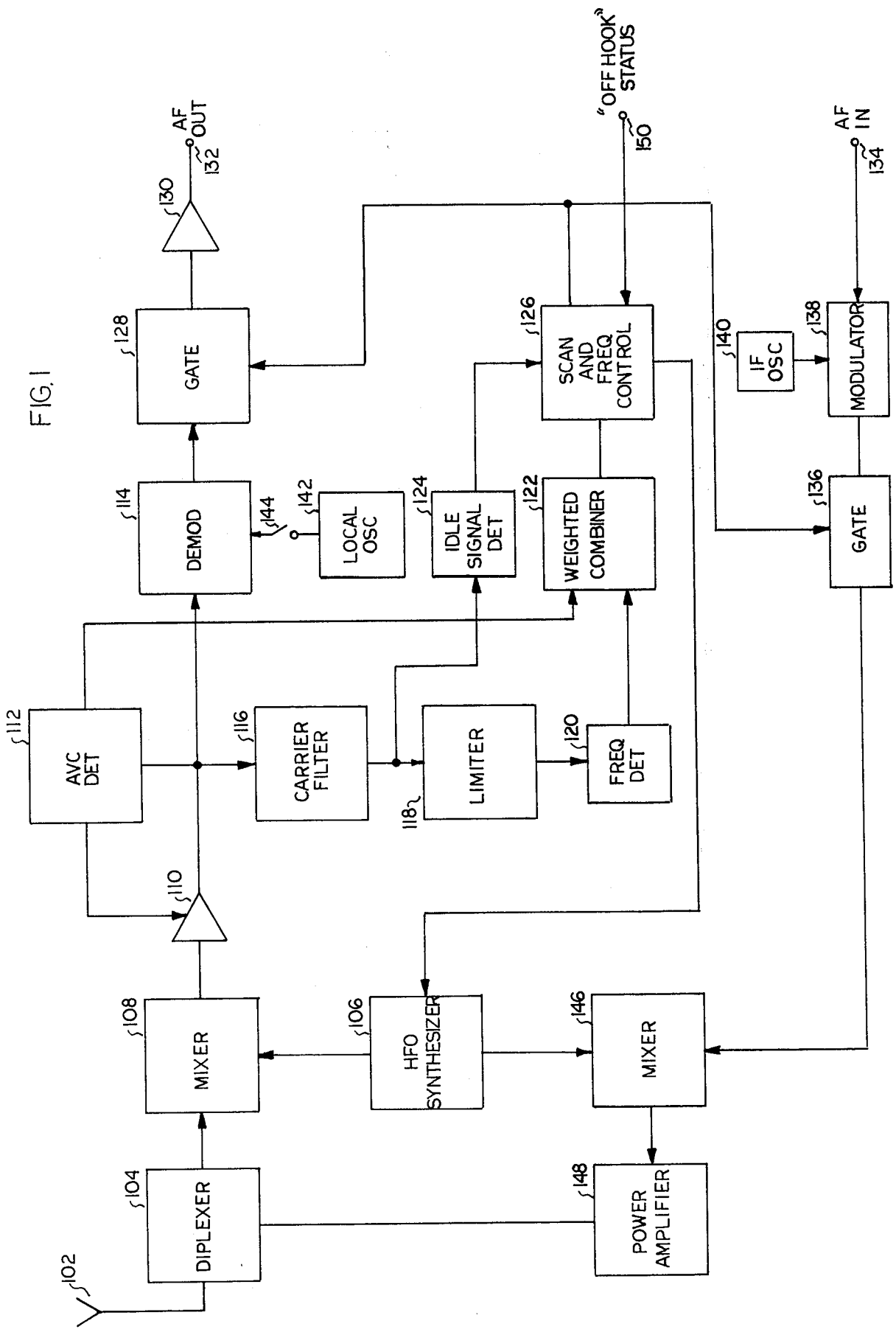
FIG. 1 shows, in simplified block form, an airborne transceiver in conformity with one embodiment of the invention.
Figure 4:
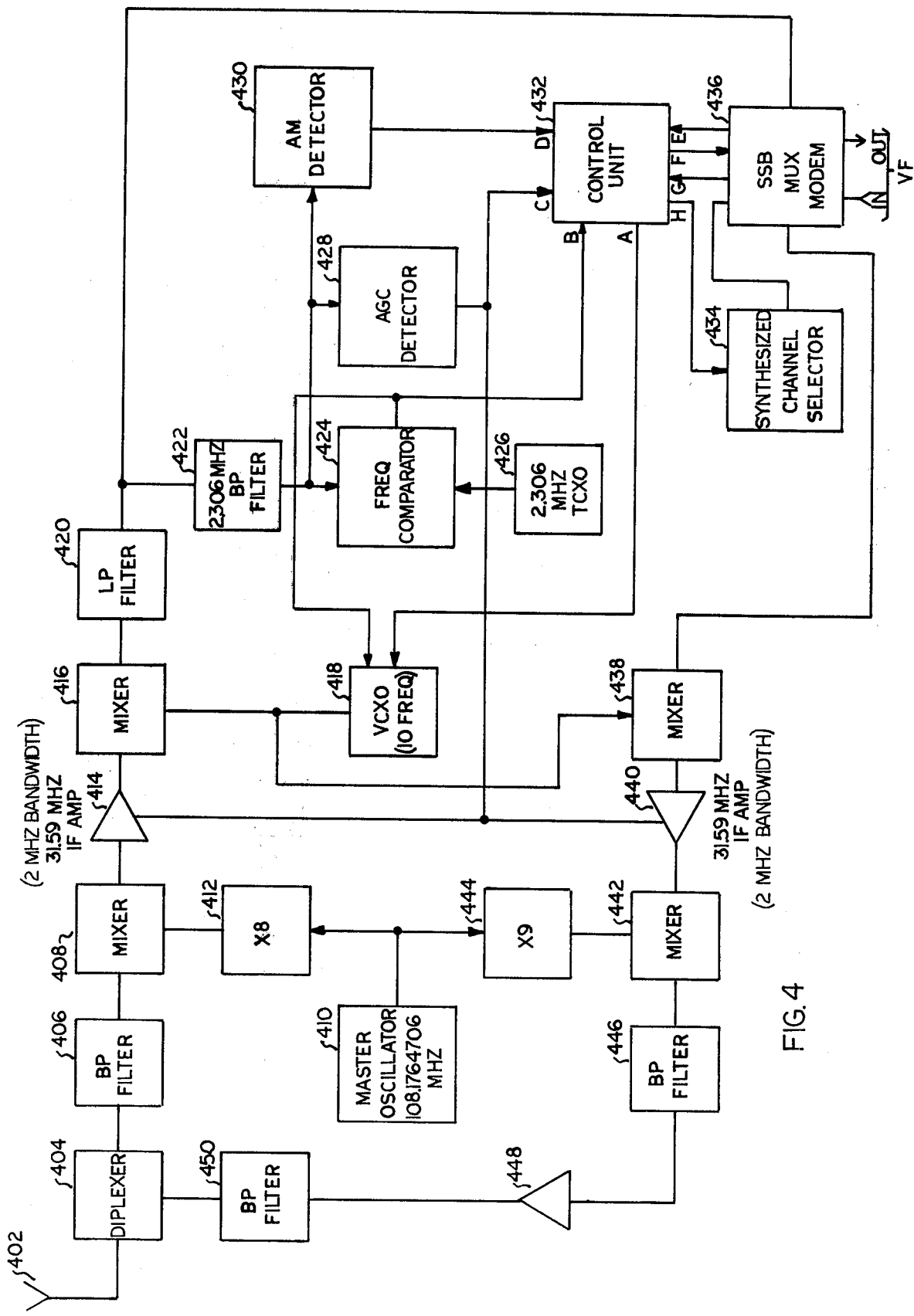
FIG. 4 shows a simplified block diagram of an airborne transceiver especially suitable for use with SSB frequency division multiplex equipped ground stations.

FIG. 1 shows, in block form, an airborne transceiver following one embodiment of the present invention especially suitable for operation with ground stations constructed to handle a single telephone conversation at a time. FIG. 4 described below shows a block diagram of a more complex transceiver capable of operating with ground stations capable of simultaneously servicing a number of telephone conversations.

Antenna 102 is used for both receiving and transmitting, and is connected to diplexer 104 which has a receiver port connected to mixer 108. Mixer 108 is also connected to HFO synthesizer 106 which provides the injection frequency to mixer 108 so as to convert received signals from ground stations to an intermediate frequency (IF), for example, 30 MHz. It is important that the frequency stability of the HFO synthesizer 106 be such as to insure against masking the expected doppler shift. Thus, if a MACH 1 aircraft receives ground signals at approximately 900 MHz, a maximum doppler frequency shift of ±900 Hz is to be expected. In order to avoid masking or swamping this effect, the HFO synthesizer 106 should have an accuracy and stability in the order of 1 part per $10^7$ during the flight so as to introduce no more than ±90 Hz error. A bandpass filter may be included in the input circuitry of a mixer 108 to provide selectivity against image frequencies and other interferring signals.

The output of mixer 108 feeds IF amplifier 110. This amplifier is preferably AVC controlled so as to reduce variations in received levels. The output of amplifier 110 feeds AVC detector 112 which in turn feeds control voltage to amplifier 110. An output of the AVC detector 112 is also used to feed the weighted combiner 122 which is used in the overall system for selecting a ground station which will be expected to provide the best service during a passenger's telephone conversation.

The output of IF amplifier 110 also feeds demodulator 114. If the modulation system used is AM or Compatible Single-Sideband (CSSB) a simple envelope demodulator is used. If FM is used, a discriminator would be suitable. And finally, if SSB reduced carrier is used, a product demodulator with local or reconditioned carrier is suitable. Local carrier oscillator 142 connected to switch 144 should be supplied, where local carrier reception is desirable for product demodulation of reduced carrier SSB signals. For local carrier reception, some form of AFC would be required in order to reduce doppler frequency errors and also compensate for oscillator stability limitations. For simplicity, the case of AM or CSSB operation is described and block 114 does not require a carrier feed nor does it require doppler error correction. Thus, local oscillator 142 and switch 144 can be deleted or switch 144 should be left in the OFF condition for AM and CSSB types of modulation.

The output of demodulator 114 feeds gate 128 which silences the audio output during periods when the circuit is being established just prior to the telephone call. Gate 128 feeds amplifier 130 which in turn feeds terminal 132 which may be connected to the telephone handset.

The output of amplifier block 110 also feeds carrier filter 116. This bandpass filter should be wide enough to pass desired signalling information used in determining the status and identification of the ground station being used, as well as uncompensated frequency instability of the system's oscillators including HFO synthesizer 106. It also should be wide enough to accommodate uncompensated Doppler shift which may be substantial if high carrier frequencies are used with high speed aircraft. Of course, Doppler frequency correction in the form of an automatic frequency control, as described below, and which is well known in the pertinent art, plus searching apparatus may be provided and a substantially narrower filter may be utilized. Such correction could be applied to the HFO 106 or used with a second IF mixer oscillator. It is also possible to provide an automatic phase control circuit to provide exact frequency control.

The output of filter 116 feeds limiter 118 which feeds a frequency detector 120. If carrier filter 116 is wide enough to allow voice sideband components, it is desirable to improve the effective filtering, say, by use of the invention disclosed in U.S. Pat. No. 3,973,203.

Frequency detector 120 may take the form of a discriminator, or may be a frequency comparison circuit, as is discussed below in the section covering FIG. 4, Blocks 422, 424 and 426.

Assuming other causes of frequency errors are small, the output of frequency detector 120 will be a measure of the Doppler error. Thus, detector 120 provides a measurement of the speed of the aircraft in approaching or departing from the ground station being received. The polarity of the Doppler frequency error, whether it is plus or minus, also indicates whether an increase in signal strength is to be expected or a decrease during a subsequent telephone conversation. The measurement of doppler frequency can, in addition to being used to help select the "best" signal, be used to correct the doppler error in the above mentioned automatic frequency control circuit.

The output of frequency detector 120 feeds weighted combiner 122. Weighted combiner 122, in one embodiment of this invention, is a resistive combiner of the AVC voltage from AVC detector 112 and the voltage from frequency detector 102. For additional details see FIG. 7. Recommended blends or weightings are described below.

Carrier filter 116, besides feeding limiter 118, feeds idle signal detector 124. If the ground transmitter uses amplitude modulation for the idle tone, then a simple diode demodulator followed by a bandpass filter and a second diode demodulator may be used in this block. The absence of the idle tone causes the receiver to ignore the busy ground station and continue frequency stepping in search of a useable station. Detector 124 may also include additional tone filters and detectors to detect the presence of identifying tones that indicate that a suitable ground station is being received. In other words, if a co-channel interferring signal is received, that is not part of the network, such a tone identification will avoid it participating in the selection process. The idle signal detector, in a simplified form, can be an envelope detector followed by one or more bandpass filters having center frequencies equal to the tone modulation frequency expected, followed by one or more second diode detectors to convert the tone outputs of the filters to dc waves. The output of the idle signal detector 124 feeds Scan and Frequency control 126.

The transmit portion of the transceiver is fed a voice wave at contact 134 which feeds modulator 138. Modulator 138 is also fed the IF carrier wave generated in IF oscillator 140. Modulator 138 can be an amplitude modulator, SSB generator, (either CSSB or SSB reduced carrier) or a frequency modulation generator. For best spectrum efficiency, one of the SSB types should be used. The output of modulator 138 feeds Gate 136 which keys off the transmit section prior to initiation of the call so as to avoid radiation during the tune-up period.

The output of the IF modulated wave from Gate 136 feeds mixer 146. This transmitter mixer converts the IF modulated wave to a frequency that the selected ground station will accept. The correct injection frequency is programmed into HFO synthesizer 106 and is called up when the "best" received signal is selected.

The output of mixer 146 feeds power amplifier 148 which produces the required power amplified wave. Of course, power amplifier 148 and mixer 146 must have proper linearity characteristics required for the type of modulation chosen.

The output of Power Amplifier 148 feeds diplexer 104 which feeds the output of amplifier 148 to the antenna but feeds very little of amplifier output to mixer 108.

Figure 2:
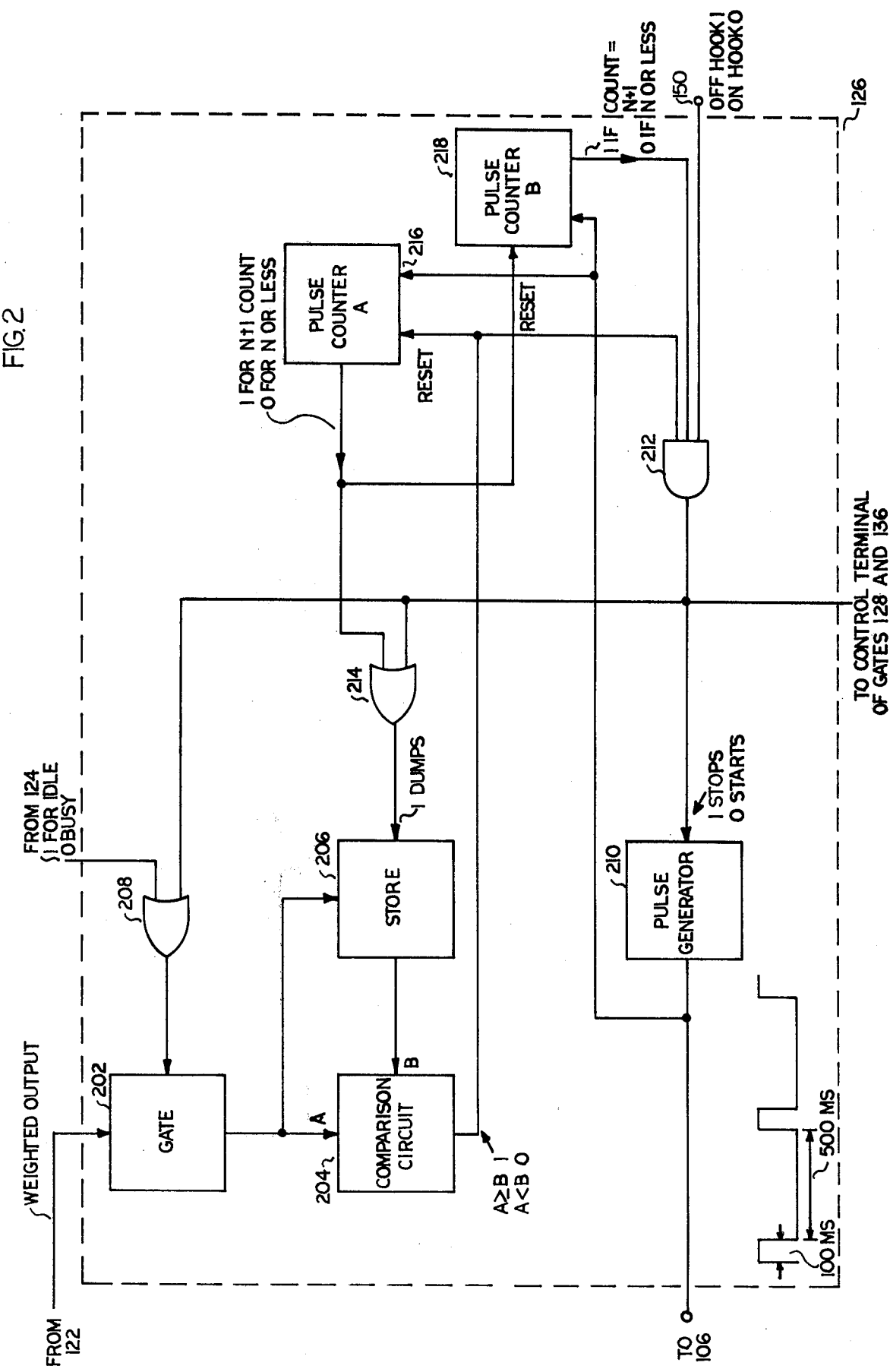
FIG. 2 shows additional details of block 126 of FIG. 1.

FIG. 2 shows details of Block 126 of FIG. 1.

The weighted output from Block 122 provides the information as to which received station would be expected to provide the best service during the next three to six minute interval (the expected length of the average telephone call to be accommodated) and feeds it to analog Gate 202. The more desirable the signal, the more positive the weighted output. This gate passes signal whenever either one of two conditions exists; viz:

(1) The output of the idle signal detector 124 indicates that the received station has an idle channel, or, (2) The instant airborne equipment is engaged in servicing a telephone conversation.

OR Gate 208 provides the necessary control of analog gate 202. OR Gate 208 is in turn controlled by idle signal detector 124 and the "Off Hook" status terminal 150. The output of Gate 202 feeds a comparison circuit 204. This comparison circuit compares the voltage from the gate which is fed to connection A of the comparison circuit with the stored voltage from analog storage circuit 206 which appears at the B input of the comparison circuit.

Storage circuit 206 may be a diode peak voltage detector (with an enhancement mode FET circuit across the storage capacitor to "dump" the stored voltage) which stores a voltage slightly less than the strongest weighted voltage fed to it for a period of at least two complete frequency scans. Thus, assuming that the weighted voltages from the various received signals do not materially change, comparison circuit 204 will provide an output of logic "one" during the time when the best signal is being received and "zero" at other times.

The storage circuit is "dumped"; i.e., its output is reduced to zero or some other voltage representing an unacceptable signal, whenever OR Gate 214 provides a positive voltage to the dump terminal of stored circuit 206. One such condition (described below) is provided by Pulse Counter A (216), which counts the pulses produced by pulse generator 210. Pulse generator 210 is connected to HFO synthesizer 106 and causes the synthesizer to step frequencies to the various N frequencies that the system accommodates. The pulses, which cause the synthesizer to step, have a duration of, for example, 100 ms and occur every 600 ms allowing the receiver to settle down for a 500 ms period from a frequency step and evaluate the received signal. In one possible mode of operation this stepping occurs continuously until the telephone is taken "off hook" at which time the then "best" signal is selected and maintained during the full telephone conversation. Pulse generator 210, besides feeding synthesizer 106, feeds pulse counter A, 216, and pulse counter B, 218.

Referring to pulse counter A, 216, this counter is reset whenever comparison circuit 204 produces a one output indicating the best scanned signal is present. The circuit produces a logic 1 when the pulse count exceeds N; i.e., counts N+1. This "one" output passes through OR Gate 214 and causes storage circuit 206 to dump.

One reason comparison circuit, 204, will, at times, pass through a full cycle of N counts without sensing the "best" signal is that the best signal is no longer present. This may be due to the fact that the aircraft has moved to a location not as favorable to the signal. Another reason may be that the signal from the station is not now sending an idle signal and therefore the signal is no longer available and Gate 202 is caused to open and remove the weighted wave from the A terminal of comparison circuit 204. By dumping storage 206, the system is caused to perform a new full scan cycle and allowed to determine which of the remaining signals is best.

When pulse counter A, 216, produces a "one" causing the storage circuit to dump, it also resets pulse counter B, 218. This counter will produce a "one" if it counts to at least N+1 pulses indicating that after the storage is dumped the system has at least scanned all of the available frequencies and the system is ready to select a new "best" signal. Pulse counter, B, 218, by providing one of the three inputs to AND Gate 212, provides protection against selection of a signal prior to a full scan.

AND Gate 212 is also controlled by comparison circuit 204 and the telephone "off hook" circuit. Thus, three conditions must prevail before AND circuit provides one stopping pulse generator 210:

(1) The telephone subscriber must have taken the phone off the hook.

(2) The comparison circuit must indicate that the transceiver is tuned to the best frequency available at the time, and, (3) At least a full frequency scan has been performed before the system makes its selection.

AND Gate 212 controls pulse generator 210 and whenever the AND Gate produces a logic one, pulse generator 210 is caused to stop. Therefore, the HFO Synthesizer 106 is maintained at its last selected frequency. AND Gate 212 also feeds OR Gate 214 causing storage circuit 206 to be dumped during the period of the telephone conversation. This has two advantages:

(1) It prepares the system for recycling immediately after the telephone is put back on the hook, and, (2) It insures a continuous logic 1 output from comparison circuit 204, which is necessary to cause AND Gate 212 to continue to command the pulse generator 210 to stay in the stopped condition.

AND Gate 212 also feeds OR Gate 208 maintaining closure of Gate 202 even though an idle circuit tone will not be received from the station being used by the circuit. This further insures the maintenance of a logic "1" output from comparison circuit 204.

The output of AND Gate 212 also feeds the control terminals of Gates 128 and 136 allowing the subscriber to hear the received signal and to transmit to the ground station.

It will be apparent to those skilled in the pertinent art how conventional ground station transmitting and receiving equipment can be constructed to be compatible with the airborne transceiver shown in FIG. 1. For example, the low frequency idle signal tone can be incorporated in the ground station transmission means indicating when the ground station is available for establishing communications with an airborne station.

A squelch may be incorporated in the ground receiving means which, besides muting noise when no signal is received, keys off the idle signal tone when a signal is received. Generally, a low frequency tone, say having a frequency of 150 Hz, may be used for the idle signal tone. Alternately a two tone idle signal may be used to improve protection against false operation by interference. The ground station must incorporate equipment for interfacing with the subscriber telephone network if the communications system is to be used for public telephone purposes.

In order to avoid co-channel interference, ground stations should not be assigned to the same frequency within a given area, say, for example, a radius of 500 miles. Of course, these and other requirements of the ground station will be apparent to those skilled in the pertinent art.

Figure 3:
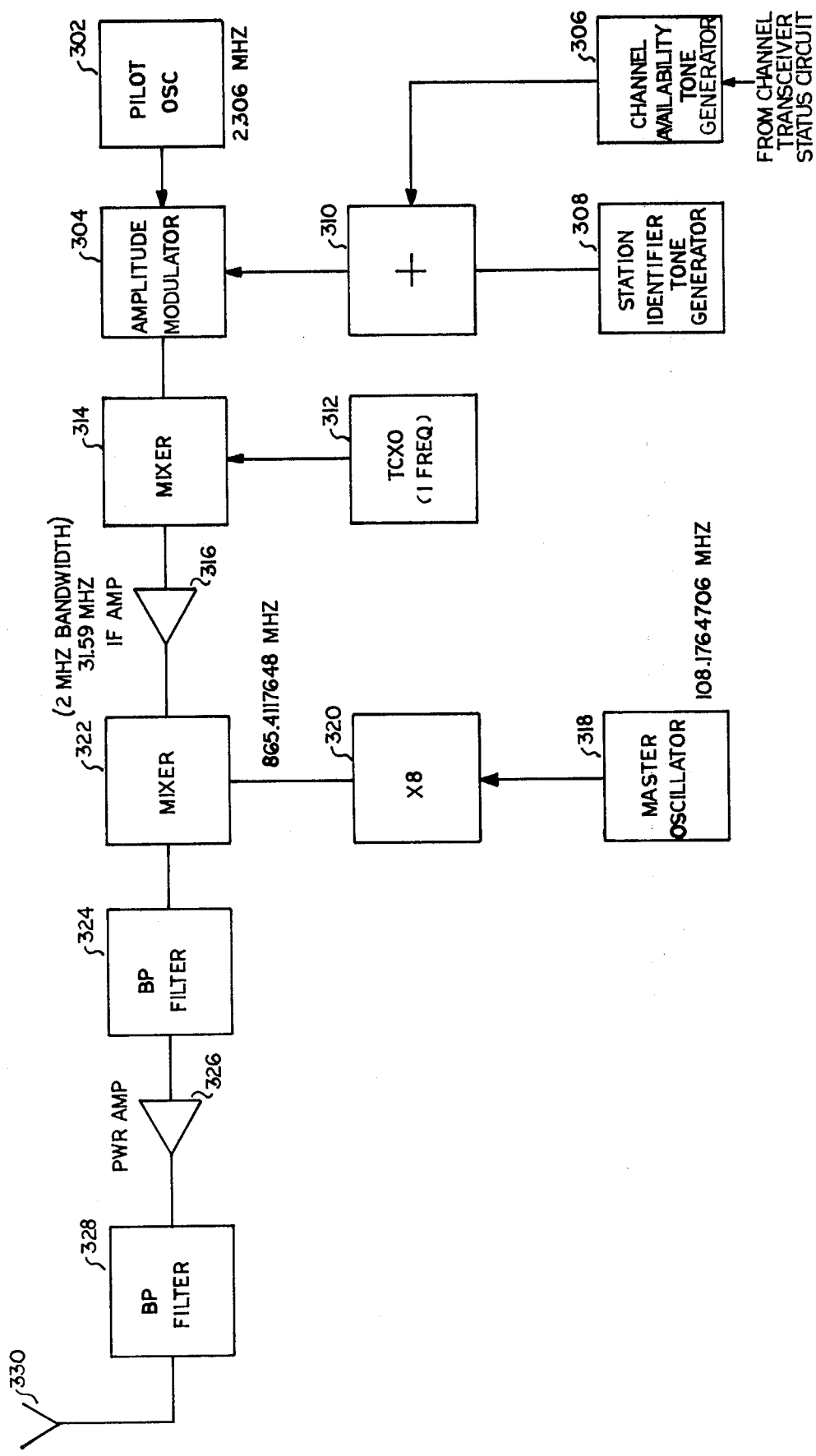
FIG. 3 shows a pilot carrier ground station transmitter.
Figure 5:
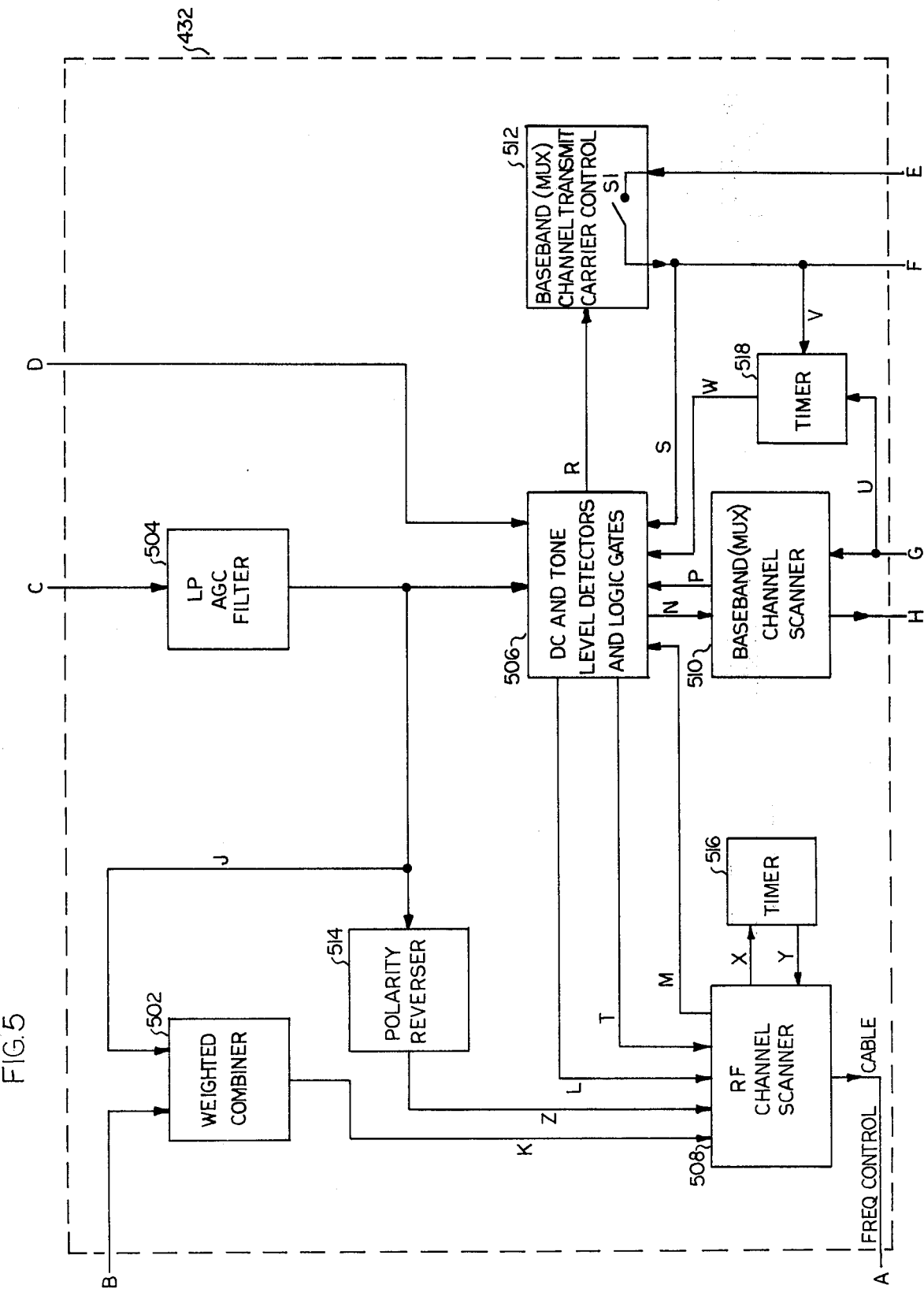
FIG. 5 shows details of block 432 of FIG. 4.
Figure 6:
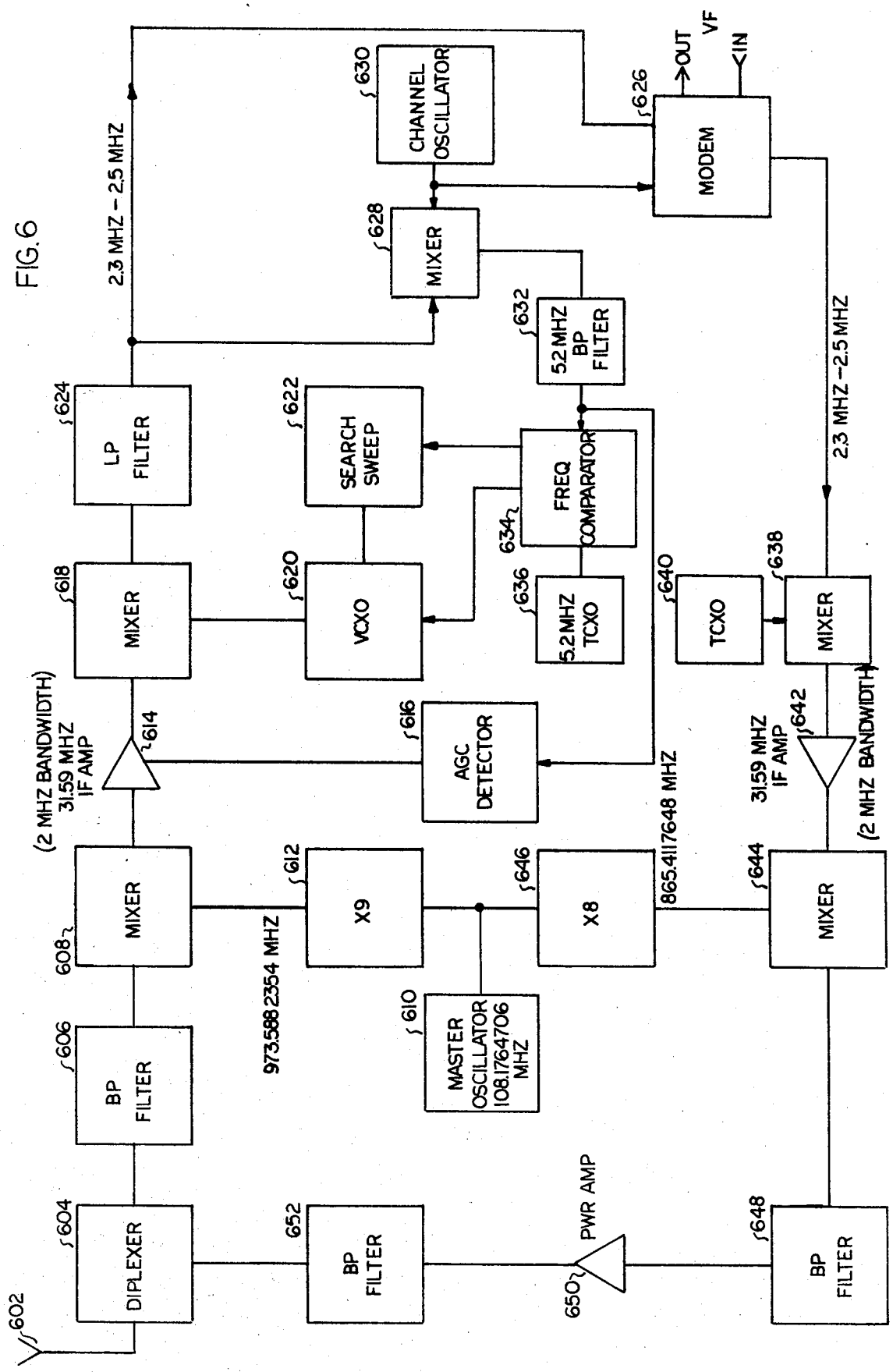
FIG. 6 shows a simplified block diagram of a ground station transceiver suitable for operation with the airborne transceiver of FIG. 4.

FIGS. 3 and 6 show block diagrams of ground station equipment and FIGS. 4 and 5 show block diagrams of airborne equipment suitable for use with single-sideband frequency division multiplex (MUX) systems. They show how the instant invention may be used to improve such SSB MUX systems.

Details on one such system were filed on Oct. 25, 1979 with the Secretary of the United States Federal Communications Commission, in a document entitled "Air/Ground Radio Telephone System", submitted by the Airfone Inc., bearing the date of Oct. 25, 1979. This document is incorporated by reference in these specifications. This document indicates the background of the invention and illustrates the state-of-the-art by describing one possible arrangement for providing air/ground telephone communications throughout the Continental United States. The proposed system utilizes up-link frequencies of 896 to 898 MHz. The down-link frequencies are 941 to 943 MHz but, as pointed out above, each ground channel would utilize only 200 kHz of the uplink 2 MHz bandwidth and 200 kHz of the 2 MHz down-link bandwidth at a specific ground station.

Additional details of single-sideband (SSB) systems, as well as frequency division multiplex systems are disclosed in a number of publications including patents, periodicals, and books; for example, see Transmission Systems for Communications, 4th Edition, Feb. 1970 by members of the Technical Staff of Bell Telephone Laboratories as published by Bell Telephone Laboratories, Inc. Also see Radio Engineering Handbook, 5th Edition, 1959, McGraw-Hill, N. Y., for additional information on applicable radio techniques.

FIG. 3 shows a ground pilot carrier transmitter which can be used in conjunction with a SSB frequency division multiplex (MUX) ground station compatible with the airborne transceiver shown in FIG. 4.

Pilot oscillator 302 operates at a frequency of 2.306 MHz in one embodiment of the system. The output of oscillator 302 feeds amplitude modulator 304. The audio fed to modulator 304 is the station identifier tone from generator 308 and the channel availability tone generator 306. The tone generator 306 is keyed on to indicate all channels are busy by an external control circuit. This control circuit acts as a AND circuit keying on whenever all of the ground station's channel transceivers are busy. The outputs of generators 306 and 308 are combined in sum circuit 310.

The 2.306 MHz amplitude modulated wave output of modulator 304 feeds mixer 314. Temperature compensated crystal oscillator 312 also feeds mixer 314. The output of mixer 314 has a component in the range of 31.59 MHz, ±1 MHz, depending upon which of the 10 channels are assigned. Thus, one model of the ground pilot transmitter can be used at the various ground stations in the network installed at the various sites along the flight path. This reduces costs and provides interchangeability of parts. The only difference in parts need be the frequency of oscillator 312.

The output of mixer 314 feeds IF amplifier 316 which has a bandwidth sufficient to cover the operation of any one of the assigned frequencies.

The output of amplifier 316 feeds mixer 322. Mixer 322 is also fed a wave having a frequency of slightly over 865.41 MHz in common with all pilot transmitters and as also used in both the ground and airborne transceivers. This frequency is derived from a stable oscillator operating at slightly above 108.17 MHz (master oscillator 318). The exact frequency of the oscillator is merely shown as an example but it is desirable to use one frequency in common as it reduces the number of spare precision oscillators stocked and it allows the possible sharing of master oscillators among the ground transceivers as well as the ground pilot transmitter.

The output of master oscillator 318 is frequency multiplied by a factor of 8 in multiplier 320 to produce the desired injection frequency for mixer 322. The output of mixer 322 feeds bandpass filter 324 which selects the desired mixing components which in turn feeds a power amplifier 326.

The output of amplifier 326 feeds bandpass filter 328 which insures acceptable attenuation of RF harmonic components. The output of filter 328 feeds antenna 330.

According to the Airfone system, fifty-one ground stations, each equipped with a pilot carrier ground station transmitter as shown in FIG. 3 and up to 31 transceivers as shown in FIG. 4, each servicing different multiplex channels, would be located at the 51 ground sites.

The stated frequency plan uses 200 kHz multiplex blocks and ten RF 200 kHz channels. In order to avoid interference, ground stations, using the same blocks of frequencies are separated, according to one plan, by at least 500 miles. The airborne equipment, as shown in FIGS. 4 and 5, is designed to switch to any one of the ten frequencies as the aircraft flies from one location to the other.

According to the Airfone plan the aircraft would initiate a call and complete the call with one single ground station. This avoids the complexity and expense of implementing "handling over" the circuit from one station to the other. The one proposed plan also would operate so as to only allow origination of calls from the aircraft. The individual (MUX) channels would be assigned a 6 kHz bandwidth to provide for toll quality telephone operation plus expected Doppler frequency translation errors and imperfections in the stability of practical oscillators.

The output of filter, 406, feeds a mixer 408, which should be preferably a low noise mixer wherein the local oscillator produces an output, for the example shown, having a frequency of 865.4117648 MHz (decimal not rounded off so that the arithmetic of the example can be checked).

The IF resulting will be centered at 31.59 MHz, ±1 MHz. The injection wave is derived from a 8 times frequency multiplier which in turn is fed by a high stability oscillator. The high stability is required to minimize frequency translation error and also avoid swamping Doppler frequency errors which are used in the selection procedure for insuring the use of a "good" ground station. Of course, the frequency of the intermediate frequency filter, as well as the frequency of the local oscillator, is provided as an example and any convenient intermediate frequency may be used in conformity with standard good engineering practice in the design of superheterodyne type receivers.

The output of frequency mixer, 408, feeds an IF amplifier 414. This IF amplifier is part of an automatic volume control circuit and, accordingly, the gain of the amplifier is an inverse function of the input signal strength. The output of the amplifier feeds a second frequency mixer, 416. This mixer converts the first IF Pilot carrier signal to a frequency 2.306 MHz.

As mentioned above, in one application of the invention the flight path is serviced by a number of ground stations. Each station is assigned one of ten 200 kHz frequency blocks and these frequency blocks are not repeated in a particular area so as to minimize interference from co-channel stations. Typically, stations assigned the same block of frequencies would be separated by at least 500 or 600 miles. Thus, in order to service all ground stations, oscillator 418 has ten separate operating frequencies. The selected frequency of this oscillator is determined by the frequency of the ground station with which the system will communicate.

In one preferred application of the invention, RF channel 1 would require the operating center frequencies of oscillator 418 to be 34.882352 MHz. Thus, as mentioned above, the oscillator frequency specified is the center frequency and it is caused to follow doppler shift and, therefore, assuming all oscillators used are perfectly centered, the oscillator would have to cover a range of approximately ±900 Hz.

The output of mixer 416 feeds lowpass filter 420 which passes signals in the range of 2.3 to 2.5 MHz accommodating operation on any one of 31 6kHz MUX channels. Of course, it is possible to use a bandpass filter covering this range instead of a lowpass filter.

Lowpass filter 420 feeds received multiplex signals to an SSB modem which may be, for example, a suitably modified MC-400 as manufactured by the Motorola Communications and Electronics, Inc. of Schaumburg, Ill. The main modification required would be to replace the channel crystal oscillator with an injection wave from block 434. The modem demodulates the desired IF channel of the 31 ground channels available to produce an audio output.

Lowpass filter 420 also feeds bandpass filter 422 which is center tuned to 2.306 MHz. The bandpass of this filter should be wide enough to pass the desired carrier plus or minus any expected doppler shift and frequency drift.

It is assumed that the signal-to-noise ratio is reasonably high at this point and, accordingly, the filter bandwidth can cover, for example, ±1.5 kHz. As mentioned in the description of FIG. 1, the selectivity of the filter can be enhanced by use of the teachings of U.S. Pat. No. 3,973,203 to provide a relatively pure carrier to feed frequency comparator 424. The ±1.5 kHz response will allow for doppler shift and some oscillator instability as well as any frequency drift in filter 422 itself. The output of the filter is a narrowband modulated wave which is generated in the ground pilot transmitter. This pilot conveys substantial information.

First of all, it provides information as to the amplitude of the received signal. Therefore, it feeds AGC detector 430 controlling the gain amplifiers 414 and 440. By controlling the gain of 440 the power radiated by the transceiver is reduced when transmitting to a nearby ground station thus minimizing interference.

The station identification signal can also include information as to how many multiplex channels the station is capable of servicing. Thus, the transceiver can use this information to control how many multiplex channels it should step through in search for an idle channel. The pilot channel modulation also carries information if any multiplex channel is idle and thus available for servicing a new call.

Lastly, and most importantly, it provides a reference frequency that allows the AFC system to function. This AFC circuit operates as follows:

The output bandpass filter 422 feeds frequency comparator 424. The reference local oscillator 426 operating at a frequency of 2.306 MHz allows comparison of the incoming frequency and the local frequency. The error as sensed by frequency comparator 424 is used to control oscillator 418, thus correcting for errors in frequencies such as caused by Doppler shift.

A circuit that can be used for such a frequency comparison AFC is shown in U.S. Pat. No. 2,976,411. A number of alternative type AFC and automatic phase control systems are well known to those skilled in the art.

Since Doppler shift is a problem common to transmission and reception, the correction for the reception Doppler shift can be used in correcting the transmission from the aircraft to the ground. Radio Technical Commission for Aeronautics, document DO-130, cited below, describes such a Doppler error correction system. It should be noted that there is a small difference between the reception frequency and the transmission frequency. Accordingly, there will be a small difference in Doppler shift, in the order of 45 Hz. This small difference in Doppler shift can be corrected a ground station receiver which incorporates a limited range AFC available for correcting the frequency error of the ground station local oscillator. It is also possible to provide additional circuitry that ratios the amount of control by using two VCXO oscillators instead of just a single oscillator 22 as shown.

In order to minimize cost and reduce complexity, it is preferable to provide a single Doppler controlled oscillator 418 as shown in FIG. 4. For further discussion of Doppler correction systems and other details of telephone air/ground service see Radio Technical Communications for Aeronautics, document DO-125 approved in Washington, D.C. on Oct. 15, 1964 and document DO-130 approved on Nov. 23, 1965.

The output of the frequency comparator 424 feeds voltage controlled oscillator 418 to complete the AFC loop. Control unit 432 controls the synthesized channel selector which in this example produces some 31 different frequencies corresponding to the multiplex channels.

For the transmission portion of the transmitter it is noted that modem 436 produces a modulated SSB wave within the range of 2.3 to 2.5 MHz. This wave is sent to frequency converter 438 where it is mixed with the oscillator 418. Thus, a wave that would fall in the 31.59 MHz range is fed to amplifier 440. The amplified wave then has a frequency which tends to correct for the Doppler shift of the signal sent to the ground station.

It should be noted that in one preferred version of the system, IF amplifier 440 is AGC controlled by the same AGC detector 428 which controls the receiver VGA amplifier 414. The reason for controlling the level of transmitted signal is to minimize interference to stations that utilize the same frequency range. The assumption is that the signal strength of the wave, from the ground to the air, should be relatively closely correlated with the sgnal strength required to maintain a constant received signal on the ground. Thus, if the signal received from ground station is strong it is necessary to transmit full power to the same ground station. The output of IF amplifier 440 feeds mixer 442 which converts the IF wave to the frequency range of 941 to 943 MHz. This wave is passed through bandpass filter 446 which removes undesired mixing components and it, in turn, feeds a linear power amplifier 448. Power amplifier 448 amplifies the power to a suitable power level, in the order of 20 watts, and which passes through bandpass filter 450 which may be part of the output network of power amplifier 450. The output of bandpass filter 450 feeds diplexer 404 which in turn feeds the antenna.

FIG. 5 shows pertinent details of Block 432 which follows one preferred procedure for establishing communications with a ground station. The leads in to and out of this control unit are identified by letters.

The following chart describes the functions of the lettered leads of Block 432 of FIGS. 4 and 5;

| LEAD | FUNCTION |
|---|---|
| A | Causes the VCXO to switch the airborne transceiver to any ground station RF channel. During the telephone conversation this lead causes the communications to be established with the desired ground based station. This lead may comprise 10 separate leads assuming VCXO 418 operates on 10 frequencies or may be a single lead with pulse stepping. |
| B | Carries the Doppler frequency error control information from frequency comparator to summing network 502. The frequency comparator 424 is designed to produce a positive voltage when the Doppler shift is positive which is the condition produced when the aircraft is approaching a specific ground station. In one preferred embodiment of the invention this Doppler shift voltage, when approaching the ground station, has an opposite polarity to that of the AGC voltage which is a function of the signal strength of the received signal. When the aircraft is flying away from a ground station the polarity of the Doppler shift, of course, reverses, producing a negative voltage. |
| C | Carries the AGC detector output which is proportional to the strength of the received radio pilot signal. |
| D | Carries the tone, or tones, which appear at the output of AM detector 430. In some designs it is possible to use a single detector to replace blocks 428 and 430 and thus also eliminate one of the leads (C) or (D). For best flexibility, however, two separate detectors and leads should be provided. One of the tones present on lead (D) can be used to identify valid signals and avoid false usage of an interfering co-channel signal. Equipment providing this safeguard operates so as to ignore carriers not bearing the proper identification. Many forms of identification may be used, such as a single tone keyed by an identifying pulsing characteristic or a specific two-tone wave. Detectors of such waves are well known in the art and will be readily implemented by those skilled in the art. The lead would, in the preferred embodiment, carry an all trunks busy tone. This tone would be present when all of the multiplex (MUX) channels are in use and when such a signal is received the circuitry will inhibit considering the specific RF channel and cause the equipment to scan further for a ground station that has idle capacity. |
| E | Carries the "off-hook" switch closure information which changes condition when a passenger on board lifts the telephone to place a call. In conventional MUX arrangements such activity activates a circuit in the transmitting por- |

| LEAD | FUNCTION |
|---|---|
| | tion of the MUX modem to send a reduced carrier signal to the other end of the circuit where it is received by the distant MUX modem. In this specific application the lead is placed in series with a switch S1 which is part of block 512 and it is normally open so as to prevent transmission of the MUX channel carrier until the RF channel scanner, block 508, and baseband MUX channel scanner, 510, have provided control signals indicating that an idle channel is available. |
| F | Causes the transmitting portion of the MUX modem to transmit a reduced carrier wave to the ground station when S1 of block 512 closes. |
| G | Indicates presence of the MUX channel carrier as received from the ground station. If a carrier is present, baseband (MUX) channel scanner 510 will command the RF channel selector 508 to step to the next RF channel unless inhibited by a signal from logic gate 506. |
| H | Provides commands for the synthesized channel selector, 434, to sequentially step through the 31 channels proposed in one embodiment of this invention in search of an idle channel. On completion of a call, if the channel used is seized by another airborne transceiver, scanning will be caused to resume until an idle channel is found. After the last channel 31 is scanned the sequence will repeat starting again with Channel #1. |
| J | AGC to the weighted combiner - Voltage is negative with higher values corresponding to stronger signals. |
| K | Output of weighted combiner that is used for a normal scan when the RF channel scanner is looking for the most distant station in a forward direction that can provide a useable signal. |
| L | Scan control for the RF CHANNEL SCANNER. Will inhibit a channel selection if an ALL TRUNKS BUSY tone is present or a station identifier tone is absent. |
| M | Carries command for the BASEBAND (MUX) CHANNEL SCANNER to start after the RF CHANNEL SCANNER has made a selection. |
| N | Carries command for the BASEBAND (MUX) CHANNEL SCANNER to operate unless an inhibit command is present. |
| P | Carries indication that the BASEBAND (MUX) CHANNEL SCANNER has selected an idle channel based upon the absence of a MUX channel received carrier indication on the lead (G) lead. |
| R | Carries command for the BASEBAND (MUX) CHANNEL TRANSMIT CARRIER CONTROL to operate relay switch contact S1 which causes a MUX channel carrier to be transmitted to the ground if the telephone handset is "OFF HOOK" as indicated by the (E) lead. This transmit command which is sent over the (F) lead also unmutes the receive audio circuit in the MUX MODEM. A change of state on the (R) lead will release S1 and break the circuit to the ground station as well as mute the receive audio. |
| S | Upon closure of S1 in block 512, this lead places inhibit (lock) commands on the (N) and (T) leads, thus preventing either scanner from operating. |
| T | Carries "lock" command for the RF CHANNEL SCANNER if the (S) lead indicates that a command has been initiated for transmission of a MUX channel carrier. This "lock" command takes precedence over a scan command on the (L) lead in order to prevent a scan from starting in the event an ALL TRUNKS BUSY condition is achieved during a call. |
| U | Inhibits operation of the TIMER 518 if a MUX carrier is being received from the ground. |
| V | This starts TIMER 518 as soon as S1 in block 512 closes unless inhibited promptly by the (U) lead. |
| W | Carries command to release the (R) lead and to unlock the inhibit on the (N) lead, thus permitting the BASEBAND (MUX) CHANNEL SCANNER to resume its search for an idle channel which will respond to the call. |
| X | This starts timer 516 as soon as the RF CHANNEL SCANNER stops on a selection. |
| Y | At the end of the timing interval, this lead causes the RF CHANNEL SCANNER 508 to resume its scan unless this action is inhibited by the condition of the (T) lead. |
| Z | This carries reverse polarity AGC voltage which is scanned for the strongest signal in any direction if no selection is made of a station in the forward direction. |

FIG. 5 shows the details of Control Unit 432 of FIG. 4. A Doppler correction voltage is applied to the Weighted Combiner 502 from Frequency Comparator 424 over lead (B). This is the same voltage that is used to correct the frequency of the VCXO in FIG. 4 and is arranged to be positive for a positive Doppler shift (when the aircraft is approaching the ground station), and negative for a negative Doppler shift (when the aircraft is flying away from the ground station). In this illustrative example, the sensitivity of the frequency comparator 424 is assumed to be 1.5 volts per 100 MPH radial velocity of the aircraft relative to the ground station. A second input to the Weighted Combiner 502 is the AGC (automatic gain control) voltage that enters the Control Unit 432 over lead (C), passes through Low-Pass Filter 504 which smooths the effects of flutter fading, and enters the Weighted Combiner 502 over lead (J). This AGC voltage is negative with more negative values indicating stronger signals. (The AGC voltage for FIG. 1 is assumed to be positive).

Figure 7:
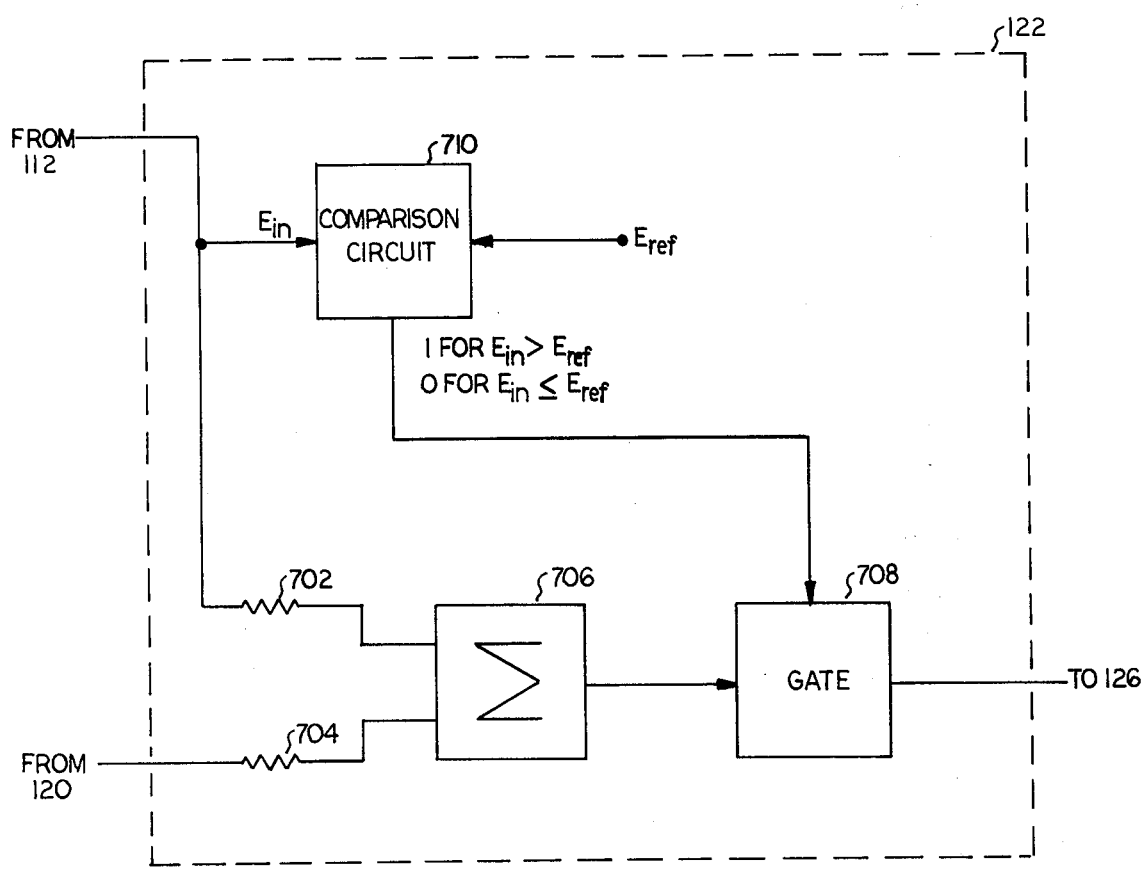
FIG. 7 shows details of weighted combiner 122 of FIG. 1.

Weighted Combiner 502 contains a gating circuit, such as that shown in FIG. 7 which does not permit the output of the combiner to pass over lead (K) unless the AGC voltage exceeds some predetermined value, say $-1.5$ V, which indicates that the received signal is strong enough to provide satisfactory service. In contrast with the Weighted Combiner arrangement shown in FIGS. 1 and 7 which tend to favor the closest ground station that is being approached by the aircraft, Weighted Combiner 502 combines Doppler and AGC voltages in opposite polarities upon approaching a ground station. The Doppler and AGC voltages are proportioned so that the Doppler correction voltage predominates. This results in generation of more positive voltages when receiving signals from more distant ground stations that are being approached at greater radial velocities. This is illustrated in Table 1 which shows the summation of the voltages at various distances and radial velocities. (Table 2 shows the same voltages for the weighted combiner shown in FIG. 1 and FIG. 7.)

The object of this arrangement is to select more distant stations in the line of flight, thus assuring longer periods of uninterrupted transmission. This constitutes the most significant deviation from the Weighted Combiner disclosed in FIGS. 1 & 2. The balance of this discussion is devoted to showing how the Weighted Combiner may typically be incorporated into a complex air-to-ground radio system, such as shown in the above cited Airfone FCC document, in which the available spectrum is divided up into sub-bands (RF Channels) and each sub-band is further divided up into individual voice bandwidth (MUX) channels.

The output of Weighted Combiner 502 passes over lead (K) to the RF Channel Scanner 508 which contains a memory, a comparison circuit and a frequency control (stepping) arrangement such as that shown in FIG. 2. RF Channel Scanner 508 will recognize only a positive voltage as indicative of a useable signal. Zero, or a negative voltage will cause the rejection of a scanned signal. If, upon completion of $2n$ steps, where n is equal to the number of scanned frequencies, a selection has not been made because of failure to find a suitable station in the forward direction, the scanner will accept an input from the (Z) lead which carries AGC voltage only. This is reversed in polarity so that it is positive and acceptable to the scanner which now selects the highest voltage (which is generated by the signal from a station that is closest to the aircraft without regard to direction). If $2n$ steps are again completed, without a selection being made, the scanner will repeat the sequence starting with an input from the (K) lead.

The tone amplitude modulation produced in amplitude modulator 304 of FIG. 3 is demodulated in block 430 of FIG. 4. Either, or both, of two tones enter the Control Unit 432 from the AM detector on lead (D) and proceed to Block 506. One tone is a station identifier which must be present to signify a valid station capable of communicating with the aircraft. If absent, a command is sent over the (L) lead to the RF Channel Scanner 508 to inhibit the selection even if a strong signal is present. This prevents selection of a station that is not equipped to communicate with the aircraft. A second tone may signify an All Trunks Busy condition. If present, a command is sent over the (L) lead to inhibit the RF channel selection.

When scanning stops, a timer 516 is activated by lead (X) to prevent dwelling on a signal from a ground station when the aircraft has flown to a new location where the station is no longer "best". This may be a 3 to 5 minute timer. At the end of this period, a command to drop the selection and start a new scan is given over lead (Y). This command may be inhibited by a "lock" command on lead (T) which will also reset the timer for acceptance of a new start command on lead (X).

Once a selection has been made, a command is sent over the (M) lead indicating that the Baseband (MUX) Channel Scanner 510 should commence its search for the idle MUX channel. The operation of this scanner is similar to that of the RF Channel Scanner 508 in that it contains a stepping arrangement, an oscillator (synthesizer) frequency control circuit and appropriate input and output control leads. The command to start a scan is given over the (N) lead. This causes stepping of the synthesized MUX channel selector by means of pulses sent over the (H) lead. Scanning is sequential and repetitious. After the nth MUX channel has been scanned, the sequence starts over with #1. If a channel is active, as indicated by presence of a carrier and thereby the presence of a control indication on the (G) lead, the scanner will continue to step. When an idle channel is reached, as indicated by absence of a carrier and presence of the appropriate control indication on the (G) lead, the scanner 510 is commanded to stop. When this happens, an indication is sent over the (P) lead. This causes a command to be sent over the (R) lead to command a relay closure of contacts S1 in the Baseband (MUX) Channel Transmit Carrier Control 512. If an "off-hook" condition is present, a circuit is completed from the (E) lead through S1 to the (F) lead to cause the MUX channel carrier to be sent to the ground. At the same time, Timer 518 is activated through the (V) lead. This timer has a period of, say one second, and its purpose is to prevent dwelling on a "dead" or defective channel. At the end of the timing period, a command is sent over the (W) lead to a gate in Block 506 and from there over the (N) lead for scanning to resume. A command is also sent via the (R) lead to release S1 in Block 512. This action allows Timer 518 to reset at the same time that the transmit carrier is cut off.

Receipt of a MUX channel carrier, as indicated by lead (U) inhibits transmission of a scan command over the (W) lead.

An indication of the closure of S1 in Block 512 is also carried via lead (S) to logic gates in Block 506. This causes "lock" commands to be sent over leads (N) and (T) to the scanners 510 and 508, thus preventing the call from being dropped except where the signal has become too weak because of the flight of the aircraft beyond the range where satisfactory communication can be maintained with the ground station. The action is then as follows: A sample of the AGC voltage from the Lowpass Filter 504 enters Block 506 where it is filtered further by a circuit with fast charge and slow discharge times. It then enters a comparator. When the voltage drops below a predetermined value, say −1.0 V, thus indicating that the circuit is becoming uncommercial, it causes release (unlock) commands to be sent over the (R), (N), and (T) leads. This allows RF Channel Scanner 508 and Baseband (MUX) Channel Scanner 510 to hunt for suitable RF and MUX channels. It also simulates an "on-hook" condition by releasing S1 in Block 512 and mutes the receiver audio via the (F) lead. This condition continues until a new selection has been made, at which time the caller in the aircraft, if still "off-hook", will receive a dial tone or other indicator that the user can initiate a new call.

FIG. 6 shows a ground transceiver which can be used in conjunction with the pilot ground transmitter to provide communications to transceivers of the type shown in FIG. 4. In one embodiment of the invention a large number of ground transceivers plus the single pilot transmitter would be used to service a number of airborne telephone channels. Of course, a single linear transmitter with a suitable frequency division multiplex exciter can be used but one important advantage of using individual ground transceivers is that it greatly improves overall system reliability because, if one of the transceivers is defective it does not cause a failure in the other multiplex channels.

The ground transceiver is connected to an antenna 602. It is possible to share one antenna with other transceivers but this requires rather complex networks which generally introduce significant power losses. The antenna is connected to diplexer 604 and its receiver port feeds bandpass filter 606. This filter passes the RF wave received from the aircraft and feeds the wave to mixer 608. This mixer should preferably be a low noise mixer so as not to degrade signal-to-noise ratio.

FIG. 6 shows a specific frequency of 973.5882354 MHz being fed from nine times frequency multiplier 612. The frequency used is not rounded off as in the above example so that the arithmetic can be checked.

The nine times multiplier is fed by master oscillator 610. This oscillator should have a very high degree of stability, in the order of one part per ten million over a year period, so as to avoid frequency errors which can cause the automatic frequency control circuitry in the airborne unit to work over a greater range and also which will confuse the doppler shift frequency measurements that are used to help select the "best" ground signal.

The output of mixer 608 feeds IF amplifier 614. This amplifier is AGC controlled so as to provide a constant audio level at the output of the modem 626. The control for the AGC is derived from detector 616 which in turn is fed a sample of the received carrier from the airborne transmitter. The output of mixer 608 has an IF frequency in the order of 31.59 MHz. The output of IF amplifier 614 feeds a second mixer 618 which is fed injection from the output of VCX0,620 (voltage controlled crystal oscillator). This voltage controlled oscillator is part of an AFC circuit described below.

This second IF wave feeds SSB modem 626 where the output of channel oscillator 630 is used to translate the received MUX channel reduced carrier to 5.2 MHz and to translate the received SSB wave to the range of 5.2003 to 5.2034 MHz where the two waves are filtered and recombined in a demodulator to produce the desired audio wave.

The second IF wave also feeds mixer 628. This mixer is fed another sample of the output of channel oscillator 630. The mixer has a carrier component at 5.2 MHz when oscillator 620 is properly centered. Prior to frequency lock, oscillator 620 is caused to sweep over a range sufficient to insure that the received carrier falls within the passband of bandpass filter 632. The output of bandpass filter 632 feeds frequency comparator 634 which may use the same type of circuitry as used for block 424 of FIG. 4.

Also feeding frequency comparator 634 is the output of oscillator 636. The output of frequency comparator 634 feeds VCX0 620 which completes the AFC loop. The AFC system corrects for oscillator instability and the inaccuracy of the airborne transceivers' doppler correction of the 'down' or air-to-ground transmission.

SSB modem 626 also produces a modulated SSB wave in the IF range of 2.3 to 2.5 MHz. This wave is fed to mixer 638 which is also fed the output of oscillator 640. The resulting output of mixer 638 in the range of 31.59 MHz is amplified in amplifier 642. The output of amplifier 642 feeds mixer 644 which is also fed the output of 8 times frequency multiplier 646 which in turn is fed by master oscillator 610.

The desired mixing component from mixer 644 is selected by filter 648 which feeds power amplifier 650. Generally the power of a ground station transceiver is greater than the airborne counterpart. The output of power amplifier 650 feeds bandpass filter 652 which in turn feeds diplexer 604 if separate transmit and receive antennas are not provided.

FIG. 7 shows additional details of weighted combiner block 122 of FIG. 1. A similar arrangement can be designed for use in block 502 of FIG. 5. The main function of blocks 122 and 502 is to weigh and combine the signal strength information with the information as to whether the aircraft is flying towards or away from a specific ground station. A further function of the weighted combiners is to reject a ground station that does not meet a minimum signal strength level.

Figure 8:
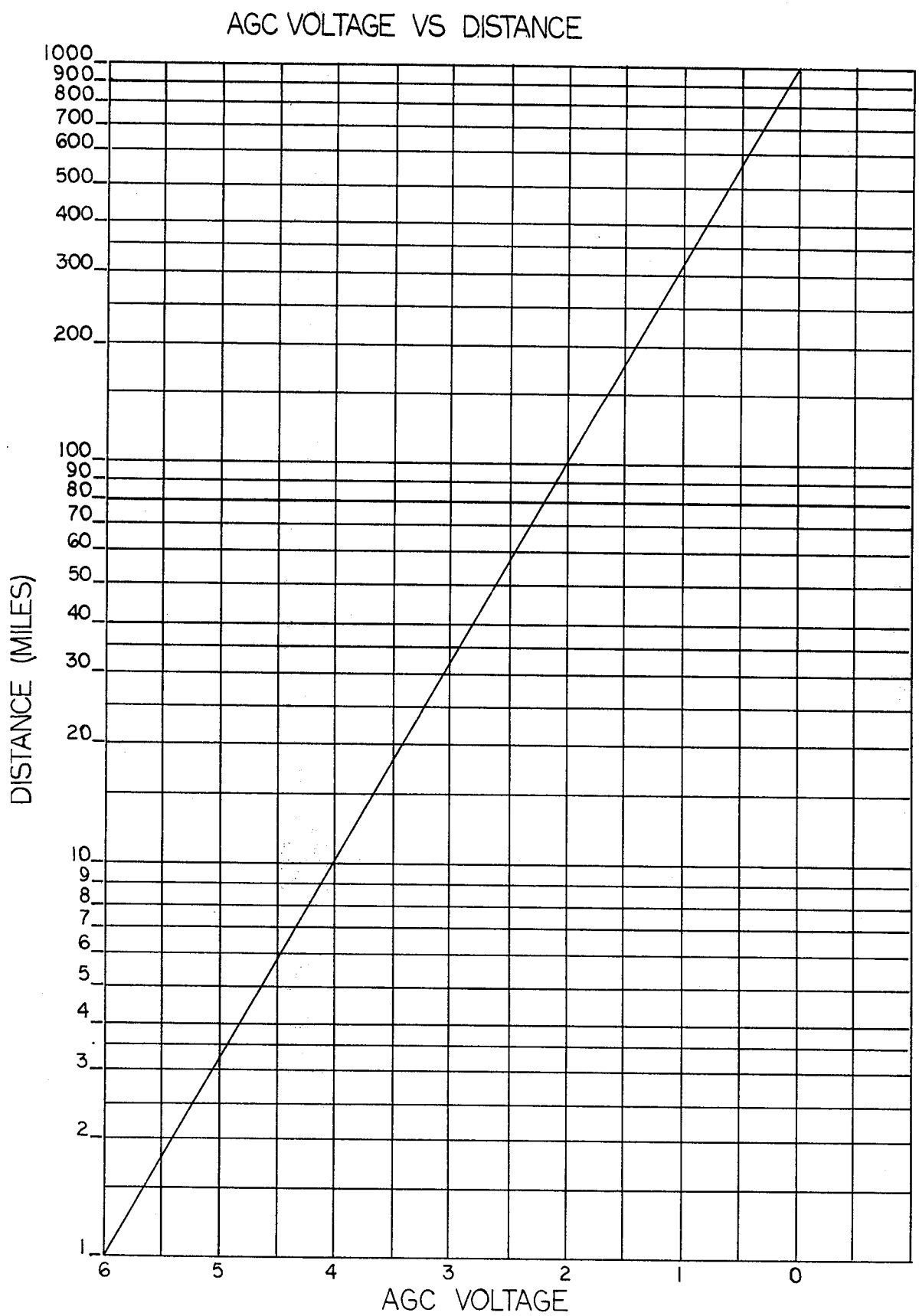
FIG. 8 is a curve of the AGC voltage vs distance for a typical control AGC or AVC system.

The AVC control voltage from block 112, which provides signal strength information, is fed through resistor 702 to summation circuit 706 which may be, for example, the emitter of a common base transistor dc amplifier. Also feeding the input of the summation stage is resistor 704 which is fed from frequency detector 120. The values of the resistors determine the blending of the information. For example, one suitable blend is 15 to 1 where resistor 704 has 15 times the resistance of resistor 702. This assumes that the sensitivity of frequency detector 120 is as shown in FIG. 9 and the AVC detector voltage as a function of distance is as shown in FIG. 8. The values shown are merely illustrative of one set of conditions and it will be apparent to one skilled in the art how to best alter the design for other sets of conditions.

The output of summation circuit 706 feeds analog gate 708. This gate is normally controlled to pass the weighted signal strength and doppler information to block 126. However, if the AVC detector 112 indicates that the signal strength of the received signal is below an acceptable level, gate 708 is caused to open, reducing the weighted voltage fed to block 126 to zero which causes such weak received signals to be rejected.

One circuit arrangement, which will provide control of gate 708, is shown in FIG. 7. A sample of the AVC voltage of detector 112 is fed to voltage comparator 710. (It is assumed that block 112 includes a lowpass filter removing all IF components and providing a proper AVC time constant.) Also fed to comparator 710 is a reference voltage $E_r$ which should be set to the voltage that would be produced by AVC detector 112 when a minimum accepted signal strength is received. If a signal is scanned that produces an AVC detector voltage below the reference voltage, voltage comparator 710 produces a logic 0 and causes gate 708 to open causing the voltage fed to block 126 to be zero and rejecting the signal no matter what the second doppler information. Conversely, if the AVC detected voltage exceeds the reference voltage block 710 produces a logic 1 voltage causing gate 708 to pass the weighted voltage.

The two methods of combining and weighting the signal strength and Doppler frequency measurements shown in FIG. 5 and FIG. 7 are illustrated by Tables 1 and 2.

Both Tables 1 and 2 are based on FIGS. 8 and 9. FIG. 8 is an AGC voltage vs distance curve. This is typical of the control voltage developed from AVC detector 112 of FIG. 1 and AGC detector 430 of FIG. 4. It is assumed that a positive control voltage is developed by detector 112 and a negative control voltage is developed by detector 430. FIG. 9 shows a curve of Doppler correction voltage vs. radial velocity. Only one quadrant of the curve is shown and if the aircraft flies towards the ground station a positive voltage is assumed to be produced and if the aircraft flies away from the ground station a negative voltage is produced.

Table 1 shows that the favored or "best" station is the one that has the largest positive Doppler shift error even though it is a distance from the aircraft and produces very weak AGC voltages.

Indeed, if gating was not incorporated in control unit 432 an unuseable signal would be selected with the expectation that a much improved signal would be available later. Actually, the proper weighting and combination of opposite polarity AGC and Doppler error voltages plus weak signals rejection procedures, results in the selection of the weakest acceptable signal which is transmitted from a ground station towards which the aircraft is flying. The weighting used in Table 1 is 1/1; i.e, the full voltages of FIG. 8 and FIG. 9 are combined. Thus, this "best" signal should provide acceptable service for the longest period of time.

Table 2 shows the results of combining weighted AGC and Doppler correction voltages of the same polarity and with the 15/1 weighting of 1. (i.e., where the Doppler measurements of FIG. 9 are reduced by 15/1 before adding them to those of FIG. 8.) In this case the strongest station, towards which the aircraft is flying, will be selected as the "best" signal. Actually, a factor that somewhat modifies the selection is that high speed commercial airlines generally fly at high altitudes and this reduces the radial velocity especially when the aircraft starts to fly over the ground station when the radial velocity passes through zero and reverses. In any case this same polarity combiner technique favors ground stations that are located close to the aircraft's location.

Thus, the same polarity weighted combiner provides best performance for short telephone conversations which might be expected for short flights, say the shuttle flight from New York to Boston. On the other hand, the opposite polarity combiner best serves long telephone calls, say of the length expected during long flights such as from Washington, D.C. to San Francisco.

In the selection of the proportions of AGC and Doppler shift voltages which are to be added in the weighted combiners of FIG. 1 and FIG. 5, consideration is given to the fact that the AGC voltage typically varies inversely as two times the logarithm of the distance and the Doppler shift voltage varies in direct proportion to the radial velocity of the aircraft relative to the ground station. Typical ranges are in the order of five volts AGC at three miles decreasing to approximately one volt at 300 miles (see FIG. 8) and a Doppler shift voltage of 1.5 volts per 100 miles per hour radial velocity (see FIG. 9). The contours of equal preference are dependent upon the proportions and polarities with which these voltages are combined in the weighted combiner.

For example, when it is desired to select the nearest ground station with a strong bias in the forward direction, the AGC voltage is applied as given above and the Doppler shift voltage is reduced to the order of 1/15 (as shown in Table 2) so that in the range of radial velocity from 0 to 700 miles per hour the voltage ranges from 0 to ±0.7 volts which is a value that approaches, but is less than the AGC voltage developed at the maximum range at which a selection may be made.

If the polarities are such that a positive Doppler shift generates a voltage of the same polarity as the AGC voltage, the addition of these voltages will result in a sum that is greater for greater radial velocity in a forward direction toward the ground station, and for a given radial velocity a sum that is greater when receiving stronger signals from closer stations.

When it is desired to select the most distant station that provides a useable signal, the full available Doppler shift voltage is applied to the weighted combiner and the AGC voltage is applied in a polarity that is reversed from that described in the preceeding case (See Table 1). A suitable proportion is one that results in a weighted combiner output approaching zero at the minimum combinations of forward distances and radial velocity at which a selection is to be made. In the preferred (forward) direction, this results in a domination of the Doppler shift voltage and a preference favoring the most distant station. This condition exists in the example given although it should be recognized that the contours of equal preference are alterable by changing the proportions.

TABLE 1

TABLE OF SUMMED AGC (AVC) AND DOPPLER CORRECTION VOLTAGES (OPPOSITE POLARITIES ON APPROACH)

| DISTANCE (Miles) | RADIAL VELOCITY IN MILES PER HOUR (+ = APPROACHING) | | | | | | |
|---|---|---|---|---|---|---|---|
| | −700 | −600 | −500 | −400 | −300 | −200 | −100 |
| 1 | −16.5 | −15.0 | −13.5 | −12.0 | −10.5 | −9.0 | −7.5 |
| 10 | −14.5 | −13.0 | −11.5 | −10.0 | −8.5 | −7.0 | −5.5 |
| 20 | −13.9 | −12.4 | −10.9 | −9.4 | −7.9 | −6.4 | −4.9 |
| 50 | −13.1 | −11.6 | −10.1 | −8.6 | −7.1 | −5.6 | −4.1 |

TABLE 1-continued
TABLE OF SUMMED AGC (AVC) AND DOPPLER CORRECTION VOLTAGES (OPPOSITE POLARITIES ON APPROACH)

| | | | | | | | |
|---|---|---|---|---|---|---|---|
| 100 | −12.5 | −11.0 | −9.5 | −8.0 | −6.5 | −5.0 | −3.5 |
| 180 | −12.0 | −10.5 | −9.0 | −7.5 | −6.0 | −4.5 | −3.0 |
| 200 | −11.9 | −10.4 | −8.9 | −7.4 | −5.9 | −4.4 | −2.9 |
| 250 | −11.7 | −10.2 | −8.7 | −7.2 | −5.7 | −4.2 | −2.7 |
| 320 | −11.5 | −10.0 | −8.5 | −7.0 | −5.5 | −4.0 | −2.5 |
| 400 | −11.3 | −9.8 | −8.3 | −6.8 | −5.3 | −3.8 | −2.3 |

| DISTANCE | RADIAL VELOCITY IN MILES PER HOUR (+ = APPROACHING) | | | | | | | |
|---|---|---|---|---|---|---|---|---|
| (Miles) | 0 | +100 | +200 | +300 | +400 | +500 | +600 | +700 |
| 1 | −6.0 | −4.5 | −3.0 | −1.5 | 0 | +1.5 | +3.0 | +4.5 |
| 10 | −4.0 | −2.5 | −1.0 | +0.5 | +2.0 | +3.5 | +5.0 | +6.5 |
| 20 | −3.4 | −1.9 | −0.5 | +1.1 | +2.6 | +4.1 | +5.6 | +7.1 |
| 50 | −2.6 | −1.1 | +0.4 | +1.9 | +3.4 | +4.9 | +6.4 | +7.9 |
| 100 | −2.0 | −0.5 | +1.0 | +2.5 | +4.0 | +5.5 | +7.0 | +8.5 |
| 180 | −1.5 | 0 | +1.5 | +3.0 | +4.5 | +6.0 | +7.5 | +9.0 |
| 200 | −1.4 | +0.1 | +1.6 | +3.1 | +4.6 | +6.1 | +7.6 | +9.1 |
| 250 | −1.2 | +0.3 | +1.8 | +3.3 | +4.8 | +6.3 | +7.8 | +9.3 |
| 320 | −1.0 | +0.5 | +2.0 | +3.5 | +5.0 | +6.5 | +8.0 | +9.5 |
| 400 | −0.8 | +0.7 | +2.2 | +3.7 | +5.2 | +6.7 | +8.2 | +9.7 |

NOTE: Doppler Correction Voltage is 1.5 V/100 MPH AGC is −Voltage

TABLE 2
TABLE OF SUMMED AGC (AVC) AND DOPPLER CORRECTION VOLTAGES (SAME POLARITIES ON APPROACH)

| DISTANCE | RADIAL VELOCITY IN MILES PER HOUR (+ = APPROACHING) | | | | | | |
|---|---|---|---|---|---|---|---|
| (Miles) | −700 | −600 | −500 | −400 | −300 | −200 | −100 |
| 1 | +5.3 | +5.4 | +5.5 | +5.6 | +5.7 | +5.8 | +5.9 |
| 10 | +3.3 | +3.4 | +3.5 | +3.6 | +3.7 | +3.8 | +3.9 |
| 20 | +2.7 | +2.8 | +2.9 | +3.0 | +3.1 | +3.2 | +3.3 |
| 50 | +1.9 | +2.0 | +2.1 | +2.2 | +2.3 | +2.4 | +2.5 |
| 100 | +1.3 | +1.4 | +1.5 | +1.6 | +1.7 | 1.8 | +1.9 |
| 180 | +0.8 | +0.9 | +1.0 | +1.1 | +1.2 | +1.3 | +1.4 |
| 200 | +0.7 | +0.8 | +0.9 | +1.0 | +1.1 | +1.2 | +1.3 |
| 250 | +0.5 | +0.6 | +0.7 | +0.8 | +0.9 | +1.0 | +1.1 |
| 320 | +0.3 | +0.4 | +0.5 | +0.6 | +0.7 | +0.8 | +0.9 |
| 400 | +0.1 | +0.2 | +0.3 | +0.4 | +0.5 | +0.6 | +0.7 |

| DISTANCE | RADIAL VELOCITY IN MILES PER HOUR (+ = APPROACHING) | | | | | | | |
|---|---|---|---|---|---|---|---|---|
| (Miles) | 0 | +100 | +200 | +300 | +400 | +500 | +600 | +700 |
| 1 | +6.0 | +6.1 | +6.2 | +6.3 | +6.4 | +6.5 | +6.6 | +6.7 |
| 10 | +4.0 | +4.1 | +4.2 | +4.3 | +4.4 | +4.5 | +4.6 | +4.7 |
| 20 | +3.4 | +3.5 | +3.6 | +3.7 | +3.8 | +3.9 | +4.0 | +4.1 |
| 50 | +2.6 | +2.7 | +2.8 | +2.9 | +3.0 | +3.1 | +3.2 | +3.3 |
| 100 | +2.0 | +2.1 | +2.2 | +2.3 | +2.4 | +2.5 | +2.6 | +2.7 |
| 180 | +1.5 | +1.6 | +1.7 | +1.8 | +1.9 | +2.0 | +2.1 | +2.2 |
| 200 | +1.4 | +1.5 | +1.6 | +1.7 | +1.8 | +1.9 | +2.0 | +2.1 |
| 250 | +1.2 | +1.3 | +1.4 | +1.5 | +1.6 | +1.7 | +1.8 | +1.9 |
| 320 | +1.0 | +1.1 | +1.2 | +1.3 | +1.4 | +1.5 | +1.6 | +1.7 |
| 400 | +0.8 | +0.9 | +1.0 | +1.1 | +1.2 | +1.3 | +1.4 | +1.5 |

NOTE: Doppler Correction Voltage is 0.1 V/100 MPH AGC is +Voltage

In all cases, it is understood that the above described arrangements are merely illustrative of the many possible specific embodiments which represent applications of the present invention. Various changes and modifications can be readily devised in accordance with the principles of the present invention without departing from the spirit of the invention and within the scope of the following claims.

What is claimed is:

1. Aircraft radio telephone receiving means equipped with means for selecting the "best" signal from a group of signals transmitted from spaced ground stations based upon the signal strength and detected Doppler frequency error of the received signals from the spaced ground stations, comprising:

(a) means for operating the receiving means on the frequencies of the signals transmitted from said ground stations,
(b) means for measuring the signal strength of each of the received ground station's signals,
(c) means for measuring the polarity and magnitude of the Doppler frequency error of each of the ground station's signals, and,
(d) means for comparing the measurements of the ground stations' signals provided by (b) and (c) means so as to enable said means for selecting to select "best" ground signal.

2. Aircraft receiving means, according to claim 1, wherein the receiving means is part of a radio telephone transceiver incorporating circuitry for receiving and transmitting at frequencies compatible with each of said spaced ground stations.

3. Aircraft receiving means, according to claim 1, wherein the (b) and (c) means produce measurement voltages having the same polarity when a strong signal strength signal is being received from a ground station towards which the aircraft is flying and including means for summating said voltages produced by the (b) and (c) means prior to feeding said voltages to the (d) means so as to select a "best" signal tending to favor a ground station close to the aircraft and towards which the aircraft is flying.

4. Aircraft receiving means according to claim 1 wherein the (b) and (c) means produce measurement voltages having opposite polarities when a strong signal strength signal is being received from a ground station towards which the aircraft is flying and including means for summating the said voltages produced by the (b) and (c) means prior to feeding said voltages to the (d) means so as to select the best signal tending to provide acceptable service over a period of time that is longer than the period of time that would be expected if any other ground station was selected.

5. Aircraft receiving means according to claim 3 wherein means is provided for blocking signal measurements from the comparison (d) means if the signal's strength, as measured by (b) means, is below a predetermined level.

6. Aircraft receiving means according to claim 4 wherein means is provided for blocking signal measurements from the comparison (d) means if the signal's strength, as measured by (b) means, is below a predetermined level.

7. The aircraft receiving means of claim 1 wherein means are provided for eliminating, from the selection process of said group of signals transmitted from spaced ground stations, those stations which, at the time of selection, do not have any idle channel comprising means for detecting the presence of busy signals.

8. An aircraft transceiver incorporating means for automatically establishing communications with a ground station, selected from a group of candidate ground stations all of which meet minimum signal strength specification, most distant from the aircraft and in the general direction towards which the aircraft is flying, said means comprising;
 (a) means for scanning the various candidate ground station signals,
 (b) means for producing a voltage with an amplitude which is a measure of the signal strength of said candidate ground station signals,
 (c) means responsive to (b) means measurement for rejecting any signal having a signal strength below a specified level,
 (d) means for producing a voltage with an amplitude and polarity which is a measure of the magnitude and direction of the Doppler frequency errors of the ground station signals,
 (e) means for combining the measurement voltages of (b) and (d) to subtractively combine the Doppler voltage generated from a signal in the direction towards which the aircraft is flying with its signal strength measurement, and,
 (f) means for initiating communications with the station whose signal produced the largest combined voltage from (e) means having the polarity of the Doppler frequency error measurement voltage for signals towards which the aircraft is flying.

9. An aircraft transceiver according to claim 8 wherein means are provided for rejecting any signal in the candidate group which does not have any idle channels comprising means for detecting the presence of busy signals.

10. An aircraft transceiver incorporating means for automatically establishing communications with a ground station selected from a group of candidate ground stations, all of which meet minimum signal strength specifications, which is expected to provide the highest average signal strength over a predetermined time period comprising;
 (a) means for scanning the various candidate ground station signals,
 (b) means for producing a voltage with an amplitude which is a measure of the signal strength of said candidate ground station signals,
 (c) means responsive to (b) means measurement for rejecting any signal having a signal strength below a specified level,
 (d) means for producing a voltage with an amplitude and polarity which is a measure of the magnitude and direction of the Doppler frequency errors of the ground station signals,
 (e) means for combining the measurement voltages of (b) and (d) to additively combine the Doppler voltage generated from a signal in the direction towards which the aircraft is flying with its signal strength voltage measurement, and
 (f) means for initiating communications with the stations whose signal produced the largest combined voltage from (e) means having the polarity of Doppler frequency error measurement voltage for signals towards which the aircraft is flying.

11. An aircraft transceiver according to claim 10 including means for rejecting any signal in the candidate group which does not have any idle channels comprising means for detecting the presence of busy signals.

12. An air/ground ratio telephone communications system comprising a multiplicity of ground stations covering an expected flight path, each of the ground stations comprising;
 (a) means for transmitting a pilot carrier frequency including means for modulating the pilot carrier with a tone signal that indicates whether a telephone channel is available at one of the ground stations,
 (b) means for providing a multiplicity of MUX channels capable of receiving and transmitting to suitably equipped aircraft stations, including means connected to (a) means indicating whether one or more channels are idle, and airborne transceivers comprising;
 (c) means capable of receiving the various pilot carrier frequencies transmitted by the ground stations,
 (d) means for scanning said pilot carrier frequencies and measuring received signal strength and Doppler frequency error of the scanned frequencies and detecting if a channel is available at the scanned ground station,
 (e) means for selecting the ground station signal best able to provide telephone service based on the signal strength and Doppler error of the received signal measured by (d) means, and,
 (f) means for establishing a telephone call on an idle channel of the selected ground station including means for transmitting a signal that will allow the selected ground station equipment to sense that said channel used is no longer idle.

13. An air/ground communications system according to claim 12 wherein the ground and airborne equipment utilize single-sideband modulation.

14. The method of selecting a ground station signal from a group of ground station signals in an air/ground radio communications system so as to best insure acceptable communications over a pre-determined maximum time period comprising the following steps:
   (a) scanning channels assigned to various ground stations sequentially,
   (b) measuring the signal strength of each of the scanned channels,
   (c) measuring the Doppler frequency error of each scanned channel,
   (d) comparing the results of the (b) and (c) steps so as to select the channel that is expected to provide the best communications service during a predetermined maximum time period.

15. The method of claim 14 including the step of detecting the presence of idle signal from the said group of ground stations' signals and rejecting all ground signals that are not transmitting an idle signal.

16. Aircraft radio telephone receiving means incorporating means for selecting a signal from a group of signals transmitted by spaced ground stations, comprising;
   (a) means for sequentially scanning the frequencies of signals transmitted by said ground stations,
   (b) means for producing voltages which are a function of the received signal strength of each of the scanned ground station signals,
   (c) means for producing voltages which are a function of the frequency error of each of the scanned ground station signals,
   (d) means for combining the voltages produced by (b) and (c) means,
   (e) means for storing the largest scanned combined voltage as produced by (d) means during a full scan sequence,
   (f) means for generating an "off hook" voltage indicating the initiation of a telephone call,
   (g) means controlled by the "off hook" voltage causing an additional scan sequence to be initiated,
   (h) means for comparing the stored largest combined voltage stored by (e) means with the combined voltages produced during said additional scan sequence,
   (i) means for halting said additional scan sequence at the frequency of the ground signal that produces a combined voltage which matches the voltage stored in (e) means, and,
   (j) means for maintaining the selection of (e) means during the period of the telephone transmission.

17. An aircraft radio telephone receiving means of claim 16 incorporating means for selecting only those signals that are transmitting an idle signal.

18. Radio telephone receiving means to be installed upon a vehicle equipped with means for selecting the "best" signal from a group of signals transmitted from spaced stationary stations based upon the received signal strength and detected Doppler frequency error of the received signals from the spaced stationary stations comprising;
   (a) means for operating the receiving means on the frequencies of the signals transmitted from said stationary stations,
   (b) means for measuring the signal strength of each of the received stationary stations' signals,
   (c) means for measuring the polarity and magnitude of the Doppler frequency error of each of the stationary stations' signals, and,
   (d) means for comparing the measurements of the stationary stations' signals provided by (b) and (c) means so as to enable said means for selecting to select said "best" stationary stations' signal.

* * * * *